(12) United States Patent
Gorham et al.

(10) Patent No.: US 9,004,496 B2
(45) Date of Patent: Apr. 14, 2015

(54) MOLDED GAP SEAL APPARATUS WITH INWARD POINTING FIBRILLATIONS

(75) Inventors: Matthew Gorham, Hampstead, NH (US); Donald James Marler, III, Emmaus, PA (US); Leslie Ann Richardson, Manchester, NH (US)

(73) Assignee: Felton, Inc., Londonderry, NH (US)

( * ) Notice: Subject to any disclaimer, the term of this patent is extended or adjusted under 35 U.S.C. 154(b) by 982 days.

(21) Appl. No.: 13/101,484

(22) Filed: May 5, 2011

(65) Prior Publication Data
US 2012/0228837 A1    Sep. 13, 2012

Related U.S. Application Data

(60) Provisional application No. 61/450,436, filed on Mar. 8, 2011.

(51) Int. Cl.
| | | |
|---|---|---|
| F16H 63/42 | (2006.01) | |
| F16H 63/00 | (2006.01) | |
| F16J 15/06 | (2006.01) | |
| F16J 15/10 | (2006.01) | |
| B29C 45/16 | (2006.01) | |
| B29C 45/00 | (2006.01) | |
| B29C 45/14 | (2006.01) | |
| B29L 31/30 | (2006.01) | |

(52) U.S. Cl.
CPC ............. *F16J 15/062* (2013.01); *F16J 15/106* (2013.01); *B29C 45/1676* (2013.01); *B29L 2031/3005* (2013.01); *B29C 45/00* (2013.01); *B29C 45/14* (2013.01)

(58) Field of Classification Search
CPC .. B29C 45/00; B29C 45/14; B29L 2031/3005
USPC .................................... 277/345; 180/90, 90.6
See application file for complete search history.

(56) References Cited

U.S. PATENT DOCUMENTS

| | | |
|---|---|---|
| 1,457,141 A | 5/1923 | Bockover et al. |
| 4,027,361 A | 6/1977 | Yoneya |
| 4,953,493 A | 9/1990 | Richmond |
| 4,964,359 A | 10/1990 | Richmond |
| 4,980,803 A | 12/1990 | Richmond et al. |
| 4,993,248 A | 2/1991 | Nordberg |
| 5,056,376 A | 10/1991 | Moroto et al. |
| 5,178,042 A | 1/1993 | Moroto et al. |
| 5,582,073 A | 12/1996 | Takeuchi et al. |
| 5,689,982 A | 11/1997 | Chang |
| 5,848,855 A | 12/1998 | Roossien |
| 5,890,383 A | 4/1999 | Chang |
| 6,082,286 A | 7/2000 | Kovach et al. |
| 6,101,854 A | 8/2000 | Chang |
| 6,133,531 A | 10/2000 | Hayduke et al. |
| 6,182,530 B1 | 2/2001 | Hattori et al. |

(Continued)

*Primary Examiner* — Gilbert Lee
(74) *Attorney, Agent, or Firm* — Peter A. Nieves; Sheehan Phinney Bass + Green PA

(57) ABSTRACT

A cover for the gap in an automobile automatic gear shift assembly is presented. The gap cover is formed from a single molded housing with inward pointing fibrillations. These fibrillations act as fingers to cover the hole created when the multi position mechanism is moved from one position to another. The fibrillations are assisted back to their original position through (1) physical properties of the advanced polymeric substance used to mold the housing and (2) through the interactions of assisting tabs formed on the back side of the fibrillations, which act as springs.

22 Claims, 10 Drawing Sheets

(56) References Cited

U.S. PATENT DOCUMENTS

| | | |
|---|---|---|
| 6,843,521 B1 | 1/2005 | Oana |
| 7,028,574 B1 | 4/2006 | Bell et al. |
| 7,195,095 B2 | 3/2007 | Oana |
| 7,467,570 B2 | 12/2008 | Wang |
| 7,484,433 B2 | 2/2009 | Arakawa et al. |
| 2008/0163713 A1 | 7/2008 | Hessler |
| 2009/0165590 A1 | 7/2009 | Sugiyama et al. |

MOLDED GAP SEAL APPARATUS WITH INWARD POINTING FIBRILLATIONS

CROSS-REFERENCE TO RELATED APPLICATIONS

This application claims the benefit of U.S. Provisional Patent Application Ser. No. 61/450,436, filed Mar. 8, 2011, entitled "MOLDED GAP SEAL APPARATUS WITH INWARD POINTING FIBRILLATIONS." This provisional application is incorporated by reference herein as if fully set forth.

FIELD OF THE INVENTION

The present invention is generally related to automotive parts, and more particularly related to a cover assembly for an automotive multi position mechanism.

BACKGROUND

Multi position lever assemblies, such as a car automatic gear shift mechanism, may require a lever to traverse a slot or gap in a lever assembly mechanism. These mechanisms have a control lever that moves through a slot area. The control lever typically has a home position, for example, the "park" position in a PRNDL gear shift, but may temporarily rest at one or several stop positions along the travel path of the control lever. Since debris or other foreign matter may enter the gap and interfere with the lever assembly, a gap seal cover is provided to protect the internal lever mechanism from debris while allowing the lever mechanism to traverse the gap.

FIG. 1 shows a first prior gap seal assembly 100. The first prior assembly 100 consists of a molded housing 160 and brush assembly 110 that is fastened to the housing 160 utilizing one or more fastening mechanisms (not shown). The brush assembly 110 includes multiple bristle elements that individually extend inward to collectively cover the gap area. As a shift lever mechanism (not shown) passes through the brush assembly 110, individual bristles are temporarily displaced by the shift lever. An individual bristle element may be deflected forward in the direction of the advancing shift lever, may deflect upward or downward, for example when the lever is substantially aligned with the bristle element, or may deflect substantially backward, contrary to the direction of the advancing shift lever as the lever advances past the position of the bristle. Ideally, once the shift lever has advanced beyond the bristle element, the bristle element will resume its initial shape and position, contributing to cover the gap seal.

The first prior assembly 100 is complex and costly. It requires assembly of multiple components formed of multiple materials. Additionally, the bristles in the brush assembly tend to take a set when the multi position mechanism is moved from one position to the next, and particularly after the mechanism has been left in one position for a period of time. This set causes the gap to become and remain exposed, providing a source of contamination and potential pinch points.

For these and other reasons, the first prior gap seal assembly 100 manufactured in accordance with the background art as shown in FIG. 1 will often be undesirable. For example, as explained above, the first prior gap seal assembly 100 design of the background art is problematic in performance due to the tendency of the brush bristles to take a set and fail under high heat and deflection loads.

A second prior gap seal cover is a floor mat utilizing flexible fingers to seal the slot openings in an automobile floorboard that facilitates the travel for the shanks of foot pedals. The rubber fingers are inclined to meet at roughly a 45-degree angle, forming a chevron pattern. Like the brush bristles in the first current gap seal assembly, the rubber fingers are displaced as the lever moves through the gap. Since the rubber fingers are not supported or reinforced, the fingers may likewise take a set or become damaged due to either heat or repeated displacement force. In addition, rubber may become brittle at high or low temperature extremes, which may cause the rubber fingers to take a set in hot or cold conditions, or when coming into contact with the shift lever mechanism when the lever itself is hot or cold.

A third prior gap seal cover is an automotive gearshift indicator device. The third cover has a shift lever assembly for the automatic transmission with an aperture in the shift mechanism concealed by a slide cover that is attached to the lever body. The shift lever shaft passes through a bore in the slide cover, so that the slide cover moves with the shift lever when the shift lever is operated. The cover may be a metal tape that is coiled into spools at both ends of the shift lever aperture. As the shift lever is moved, the tape unwinds from a first spool and winds into a second spool. In order to ensure an adequate seal, the tape may be fastened to the edges of the aperture so that the gap remains sealed as the tape moves with the shift lever through the gap. This third type of gap cover consists of multiple components and is complex to manufacture and assemble.

Other previous gap seal covers suffer similar shortcomings, such as an automatic transmission shifter seal gap mechanism where a ring fastened around the gear shift lever, and two sliders are attached fore and aft of the ring. When the gear shift lever is moved, the advancing slider opens a gap seal, while the trailing slider closes the gap seal. This seal mechanism is zipper-like, and like the gap seal covers mentioned above, consists of multiple components and is relatively complex to assemble.

Another gap cover employs layered plates where the shifter shank passes through an aperture in the center, topmost plate, and this top plate slides over lower sliding plates as the shifter shank is moved. Similarly, yet another gap cover employs fore and aft accordion style covers that expand and compress when the shifter shank is moved. As with other existing designs, these styles involve multiple parts that are separately manufactured and assembled, increasing both the cost of component manufacture and the cost of assembly.

Although the difficulties mentioned above by way of example are described as applying to the current assembly designs of the background art, one or more of the foregoing difficulties may apply to structures from the background art other than those described. Furthermore, while various aspects and embodiments of the present invention may overcome one or more of the difficulties described above, not every difficulty mentioned above is necessarily overcome by all aspects and embodiments of the present invention, and there may be aspects and embodiments of the present invention that overcome difficulties in the background art other than those mentioned by way of examples above.

But whether such difficulties exist in the background art described above or in other structures from the background art that are not shown, a heretofore unaddressed need exists in the industry to address such deficiencies and inadequacies.

SUMMARY

Accordingly, the present invention is directed to a gap seal cover having a housing, where the housing is substantially flat with a top surface and a bottom surface. The housing has a gap cover region having a travel axis and a stationary axis, and a shift lever travel path formed by a first slit through the gap cover region substantially parallel to the travel axis. The gap cover region has multiple fibrillations formed by multiple slits cut through the gap cover region. Each fibrillation slit intersects the shift lever travel path, and each fibrillation is bounded by two fibrillation slits, and the shift lever travel path. The gap seal cover has a connection area surrounding the gap cover region. The cover has multiple assistance tabs, where each assistance tab is associated with a fibrillation, with each assistance tab engaging the associated fibrillation on the fibrillation bottom or the fibrillation top surface.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
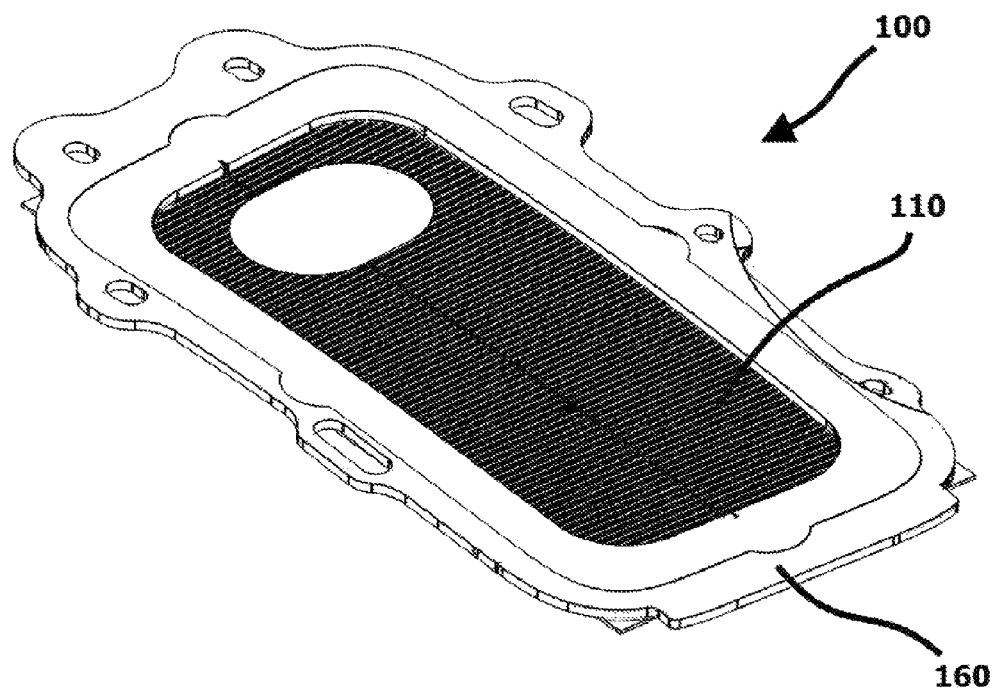
FIG. 1 is a diagram of a prior art brush gap seal assembly.

Reference will now be made in detail to embodiments of the present invention, examples of which are illustrated in the accompanying drawings. Wherever possible, the same reference numbers are used in the drawings and the description to refer to the same or like parts.

A first embodiment of the gap cover of the present invention is formed from a single molded housing with inward pointing fibrillations. These fibrillations act as fingers to cover a hole created when a multi position lever mechanism is moved from one position to another. The fibrillations are assisted back to their original position through physical properties of the advanced polymeric substance used to mold the housing and through the interactions of assisting tabs formed on the back side of the fibrillations, which act as springs.

Fibrillations

One aspect of the present invention is a gap seal for an automotive PRNDL (Park, Reverse, Neutral, Drive, Low) assembly. The shift lever for the PRNDL has a home position, P, and multiple stop positions, R, N, D, and L. The shift lever may travel the entire length of the assembly travel path, but may spend relatively little time in positions other than the home position and stop positions.

Figure 2:
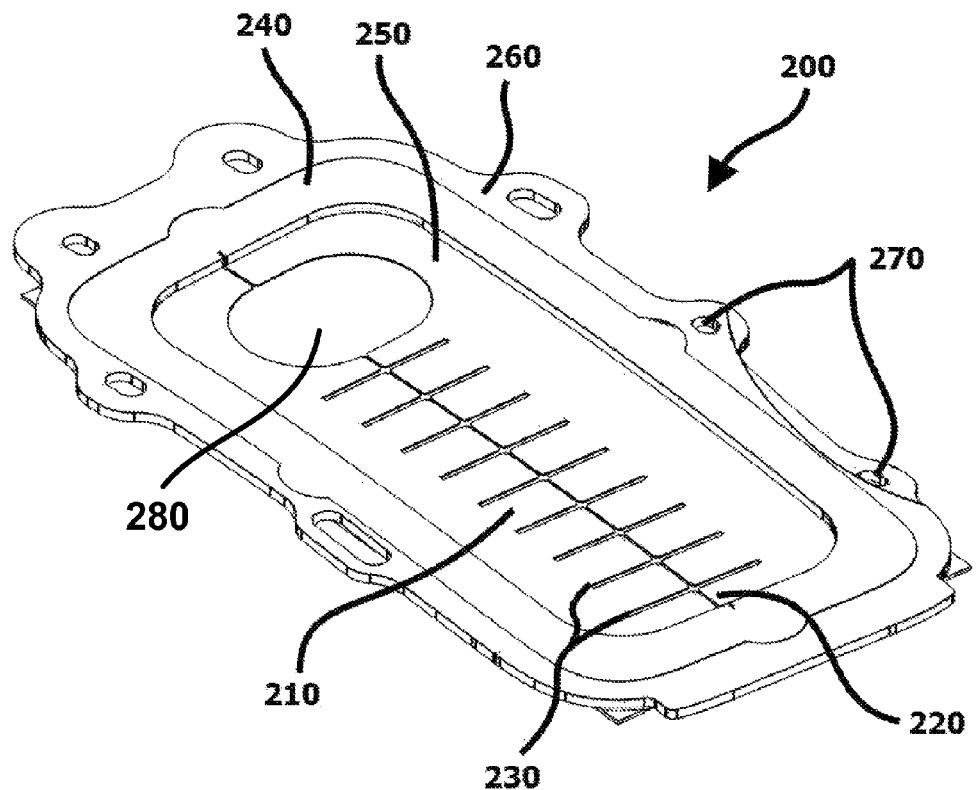
FIG. 2 is diagram of a top view of a first embodiment of the current gap seal assembly.

As shown from a top view in FIG. 2, a first embodiment of a gap seal assembly 200 is one integral unit. The first embodiment of the gap seal assembly 200 is fabricated from thermoplastic. Examples of thermoplastics include, but are not limited to, nylons, polyesters, polyurethanes, polystyrenes, and polyolefins. Other embodiments may fabricate the gap seal assembly from other advanced polymers such as, but not limited to, thermoplastic elastomers, thermoset elastomers, themoplastic urethanes, melt processable rubbers, and ethylene acetal compounds. The first embodiment is roughly rectangular shaped, but other shapes are possible, such as an ellipse or triangle, and other shapes. The gap seal assembly 200 includes a molded housing 260 surrounding a collar 240. The collar 240 in turn surrounds a gap cover region 250. In the first embodiment shown in FIG. 2, the collar 240 is raised above the plane of the gap cover region 250. However, in alternative embodiments the collar 240 may be coplanar with the gap cover region 250, or the collar 240 may occupy a plane below the gap cover region 250. Similarly, while FIG. 2 depicts the collar 240 as being coplanar with the molded housing 260, in alternative embodiments the collar 240 may occupy a plane either above or below the plane of the molded housing 260.

Figure 3:
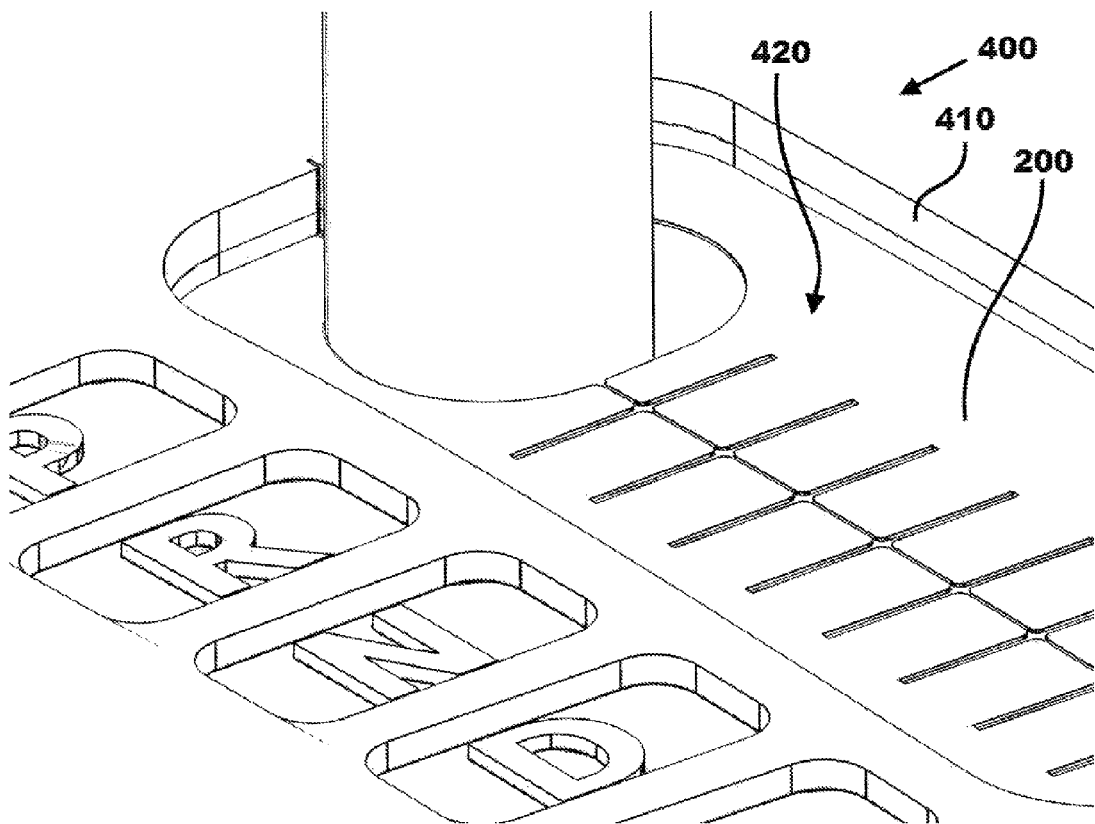
FIG. 3 is diagram of a first view of the first embodiment of the current gap seal assembly built into the engineered plastic component.
Figure 4:
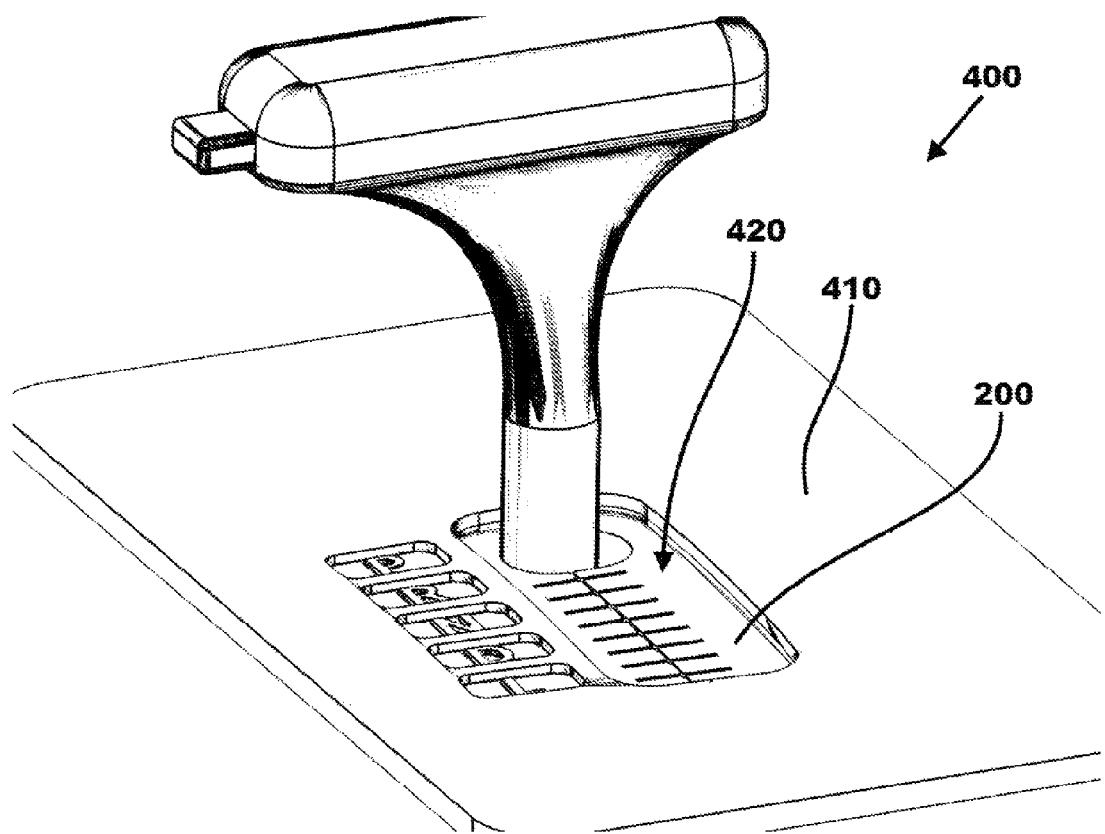
FIG. 4 is a diagram of a second view of the first embodiment of the current gap seal assembly built into the engineered plastic component.

The molded housing 260 is used to fasten the gap seal assembly to a shift console 400 (FIG. 3 and FIG. 4). As shown in FIG. 3 and FIG. 4, in the first embodiment the gap seal assembly 200 may be integrated into the shift console 400, so that the collar 240 (FIG. 2) and the molded housing 260 (FIG. 2) are installed beneath a cover plate 410, and the gap cover region 250 (FIG. 2) is revealed through a cover plate shift aperture 420. Note that while FIG. 3 and FIG. 4 depict a cover plate 410 entirely covering the collar 240 (FIG. 2), in alternative embodiments a portion of or all of the collar 240 (FIG. 2) may be revealed by the cover plate shift lever aperture 420.

Returning to FIG. 2, in the first embodiment the molded housing 260 contains several connection perforations 270, whereby the molded housing may be affixed to a shift lever mechanism (FIG. 3 and FIG. 4) by inserting pins, screws, tabs, or other fasteners (not shown) through the connection perforations 270. Alternatively, the molded housing may be implemented without connection perforations 270, and be secured to the shift console by other means that may be apparent to persons having ordinary skill in the art. For example, the gap seal assembly may be secured to the shift console by clamping the molded housing 260. Similarly, the molded housing may employ other attachment methods, such as tabs or ridges extend above and/or below the molded housing 260 that would insert into corresponding slots or grooves within the shift console 400.

The gap cover region 250 of the first embodiment is bisected by a shift lever travel path 220. The shift lever travel path 220 is typically two dimensional, and the direction of the shift lever travel path 220 in relation to the gap seal assembly 200 is called the travel axis. The axis orthogonal to the travel axis in the plane of the gap seal assembly 200 is called the stationary axis. The gap seal assembly 200 has multiple inward pointing fibrillations 210, or fingers. The fibrillations 210 in the first embodiment are oriented along the stationary axis, although there is no objection to the fibrillation orientation to be at an angle of up to 45 degrees off of the stationary axis. Each fibrillation 210 is a portion of the gap seal assembly 200, each fibrillation 210 having a distal end bounded by the shift lever travel path 220, two slits 230, and a proximal end disposed opposite the distal end. The fibrillations 210 may be uniformly sized, as shown in FIG. 2, or may be of variable size. For instance, the slits 230 between fibrillations 210 may correspond to specific intermediate locations along the shift lever travel path 220 (the shift lever is not shown in FIG. 2). In the first embodiment of FIG. 2, the gap seal assembly 200 has an aperture 280 located near one end of the shift lever travel path 220. In the first embodiment, this aperture 280 corresponds to the default or home position of the shift lever. In the case of a PRNDL assembly, the home position would correspond to the park position of the shift lever. Note that in alternative embodiments the home position may be located elsewhere along the shift lever travel path 220, for example, in the center of the travel path, and other embodiments may not have a home position aperture 280, instead having fibrillations 210 along the entirety of the shift lever travel path 220.

Each individual fibrillation 210 may extend inward from the collar 240 so that the fibrillations 210 collectively cover the gap area 250. As a shift lever mechanism (not shown) passes through the gap seal cover assembly 200, individual fibrillations 210 are temporarily displaced by the shift lever. An individual fibrillation 210 may be deflected forward in the direction of the advancing shift lever, may deflect upward from the gap or downward into the gap area, that is, above or below the plane of the gap seal cover 200. For example, a fibrillation 210 may deflect substantially upward or downward when the control lever is substantially aligned with the fibrillation 210, or may deflect substantially backward, contrary to the direction of the advancing shift lever as the lever advances past the position of the fibrillation 210. After the shift lever has advanced beyond the fibrillation 210, the fibrillation 210 will resume its initial shape and position, contributing to cover the gap area 250.

The fibrillations 210 in the first embodiment are part of the molded housing 260 and will not take a set under high heat or high deflection loads. A flex modulus of each fibrillation 210 may be in the range of 2,500 psi to 200,000 psi. Due the advanced chemistry functionalized in the fibrillations 210, the glass transition temperatures of the fibrillations 210 may be well above the temperature of the operating environment thus preserving the elastic properties of the fibrillations. Additionally, the flex modulus may allow the fibrillations 210 to flex beyond the current deflection failure points. These fibrillations 210 can be manufactured as the molded housing 260 is being made or secondarily depending on the application, as explained below.

FIG. 3 and FIG. 4 are diagrams of the first embodiment of the gap seal assembly 200 when integrated into the shift console 400. The cover area 250 of the gap seal assembly 200 is visible through the cover plate shift aperture 420 in the cover plate 410.

Assistance Tabs

Figure 5:
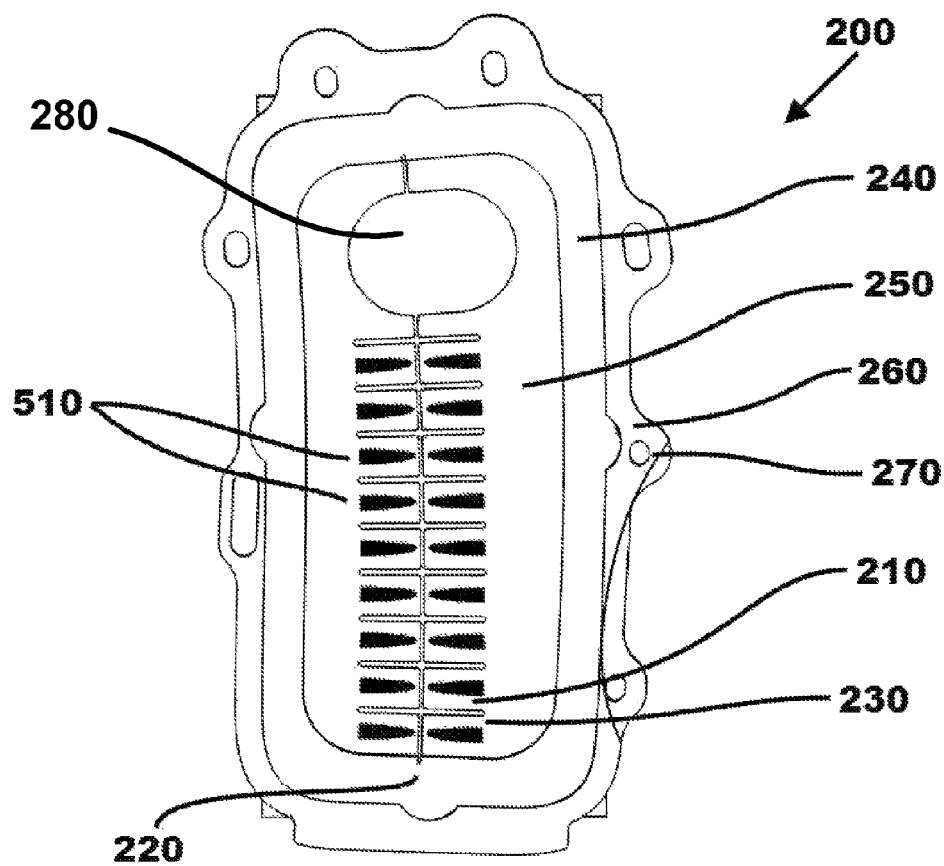
FIG. 5 is a diagram of a bottom view of a first embodiment of the current gap seal assembly.

FIG. 5 shows a view of the bottom side of the first embodiment of the gap seal assembly 200. This view shows the side that will not typically be in plain sight when the gap seal assembly is in place. The underside of the fibrillations 210 may include assistance tabs 510, or "assist tabs," that help the fibrillations 210 return to their original position when the multi position mechanism (not shown) is moved to different positions along the shift lever path 220. These assist tabs 510 act as springs to ensure a tight and fast recovery of the gap seal fibrillations 210.

Figure 6A:
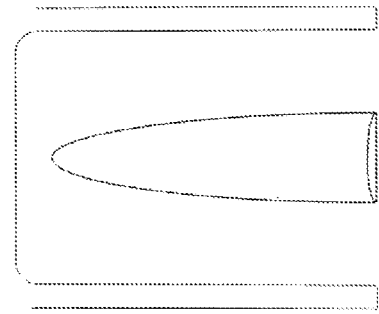
FIGS. 6A-6E are diagrams of embodiments of variations on positioning of assist tabs on fibrillations.
Figure 6D:
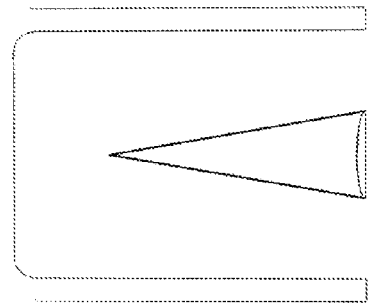
Figure 6B:
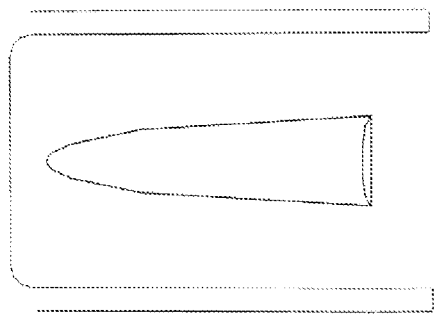
Figure 6E:
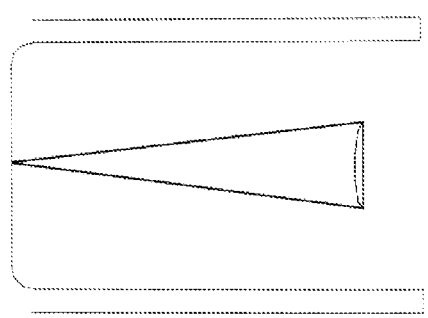
Figure 6C:
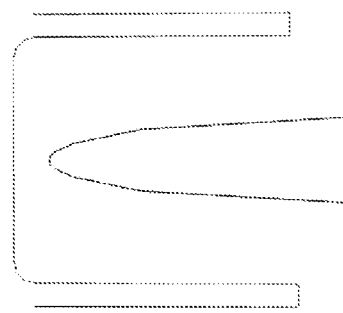

The assist tabs 510 are formed from additional material on the underside of the fibrillations 210 to provide supplemental springing action to assist the fibrillations 210 to return to form once an obstruction, for example the shift lever, is removed. In the first embodiment, each assist tab 510 is semi-canonically shaped, that is, shaped as a circular cone that has been substantially bisected along its center axis. Each assist tab 510 of the first embodiment is oriented so that the point end, or tip end, is oriented near the distal end of the fibrillation 210, and the wide end, or base end, is oriented near or at the proximal end of the fibrillation 210. As shown in FIG. 6, alternative embodiments may employ assist tabs 510 (FIG. 5) of different lengths and positioning. In the first embodiment, as shown in FIG. 6A, the base end of the assist tab 510 (FIG. 5) is aligned with the end of the proximate end of a fibrillation 210 (FIG. 5). In another embodiment, the base end of the assist tab 510 may end before the proximal end of the fibrillation 210 as shown in FIG. 6B, or as a variation, may extend past the proximal end of the fibrillation 210, extending toward the collar area of the gap seal cover as shown in FIG. 6C. Similarly, the tip end of one assist tab may end toward the end of the distal end of a fibrillation 210 as shown in FIG. 6E, while the tip end of another assist tab may end before the end of the distal end of a fibrillation as shown in FIG. 6D. While the tapered assist tabs in the disclosed embodiments have been oriented with the narrow end of the assist tab aligned toward the distal end of a fibrillation, there is no objection to an embodiment instead having the wide end of an assist tab aligned toward the distal end of the fibrillation. Other variations and combinations of assist tab positions and orientations are possible, and are to be considered within the scope of this disclosure.

Figure 7:
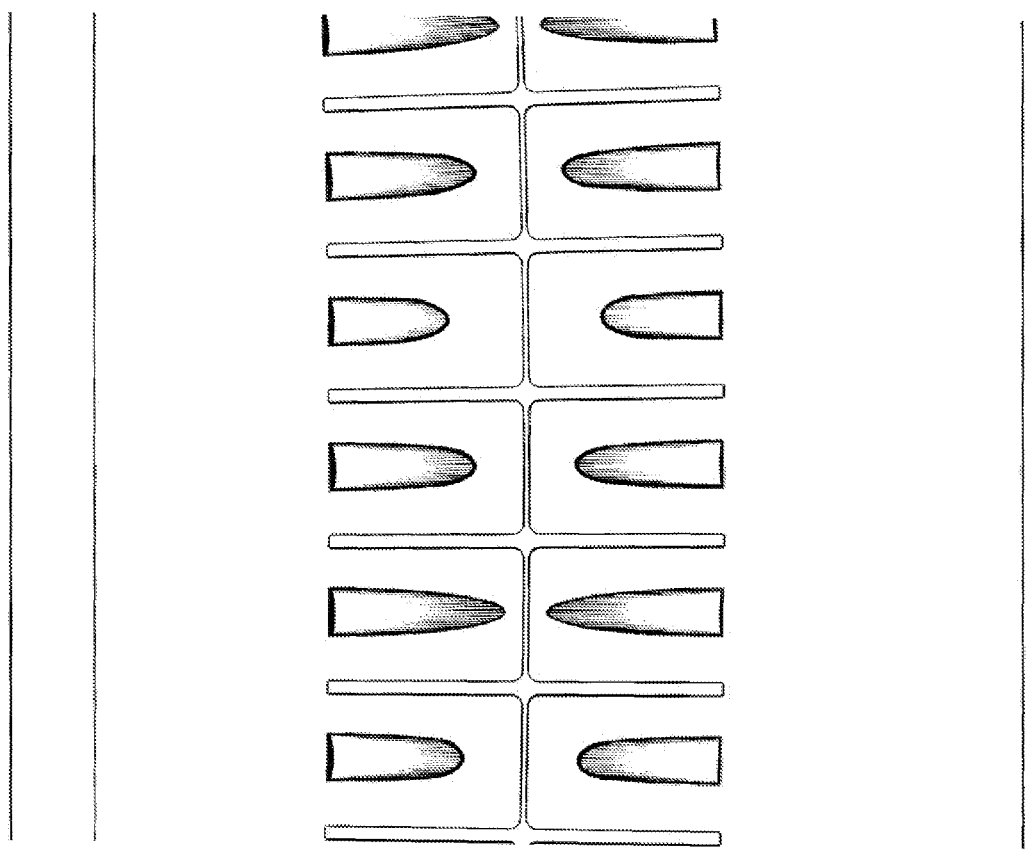
FIG. 7 is a cutaway diagram of a bottom view of the gap seal portion of a second embodiment of a gap seal assembly.

All assist tabs need not be of uniform size for all fibrillations. For example, FIG. 7 shows a second embodiment of a single gap seal cover with fibrillations where the assist tabs are longer in locations corresponding to home or stop positions in the control lever travel path, and shorter elsewhere. This could, for example, provide additional springing action in the locations where the fibrillations might otherwise tend to take a set, but less support (and hence, less resistance) in locations along the control lever travel path where the control lever does not typically stop or rest, facilitating easier movement of the control lever by only providing additional resistance where it is needed, and otherwise providing less resistance against the travel of the control lever. In an alternative embodiment, only fibrillations in positions corresponding to a control lever stop may have assist tabs, while fibrillations not located at or near a control lever stop may not have assist tabs.

FIG. 8 shows alternative embodiments with variations on the shapes of assist tabs. While the assist tabs have to this point been depicted and described as substantially semi-conical, or tapering from a wide end to a narrow or pointed end, there may be embodiments of assist tabs where the assist tabs have different shapes, or the assist tabs do not taper. In other words, the assist tabs may have a cross section that is substantially the same throughout the length of the assist tab, as shown in FIG. 8A.

Figure 8A:
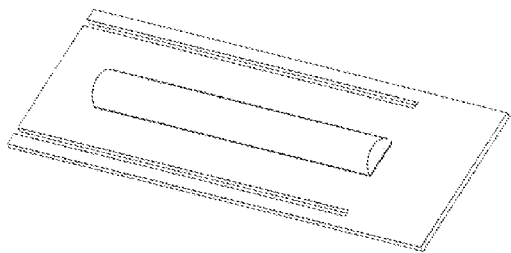
FIGS. 8A-8E are diagrams of embodiments of variations on shapes of assist tabs on fibrillations.
Figure 8D:
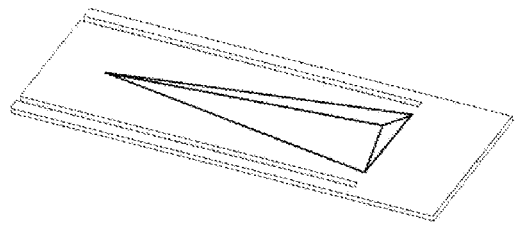
Figure 8B:
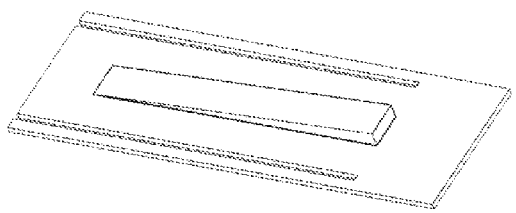
Figure 8E:
Figure 8C:
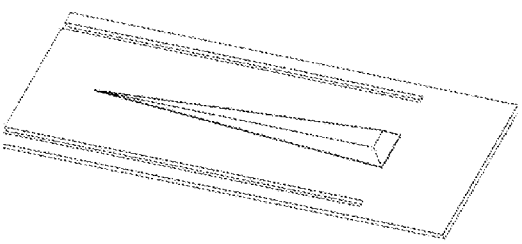

It is convenient to describe the shape of an assist tab in terms of the shape of a cross section. For example, a semi-conical assist tab might also be referred to as a semi-circular assist tab. Other possible cross section shapes may include, but are not limited to, a rectangle, shown in FIG. 8B, a trapezoid, shown in FIG. 8C, or a triangle, shown in FIG. 8C. As with sizes of the assist tabs, there is no objection to employing assist tabs having two or more cross section shapes in a single gap seal cover assembly. Similarly, another embodiment of a gap seal cover with variable resistance may use both wide based assist tabs, as shown in FIG. 8D, and narrow based assist tabs, as shown in FIG. 8E. Narrow assist tabs, as shown in FIG. 8E, may provide less resistance to the travel of the shift lever in areas where the shift lever does not stop, compared to wider assist tabs, as shown in FIG. 8D.

Figure 9:
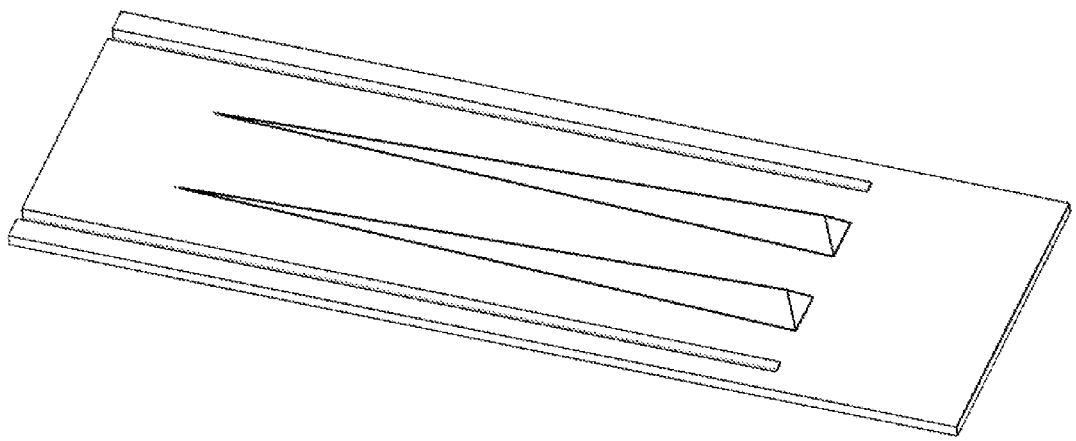
FIG. 9 is a diagram of an embodiment of a fibrillation with two assist tabs.

In the first embodiment, each fibrillation has a single assist tab on the underside of the fibrillation. In other embodiments, as shown in FIG. 9, a fibrillation may have two or more assist tabs on the underside of the fibrillation. For embodiments with two or more assist tabs on a fibrillation, each assist tab may have a relatively narrow profile. Such narrower profile assist tabs may also be referred to as "ribs." There is no objection to using narrow profile assist tabs in embodiments where there is a single assist tab on a fibrillation. In addition, there is no particular objection to implementing assist tabs on the top side of the fibrillation, or on both the top and bottom side of a fibrillation.

An assist tab may be formed of the same material as the fibrillation itself, or may be formed of a different material. Similarly, the assist tab may be formed of the same base material as the fibrillation, but may alternatively be formulated differently to have different physical properties than the fibrillation. For example, the assist tab may be formed of a stiffer material than the fibrillation, that is, a material having a lower flex modulus than the material used to form the fibrillation, providing it with additional springing action to resume the original form of the fibrillation when an obstruction is removed. There is no objection to some assist tabs having a higher flex modulus than other assist tabs. For example, it might be preferable for the assist tabs for fibrillations corresponding to travel locations of the control lever to be more flexible, compared to assist tabs for fibrillations corresponding to stop locations of the control lever. This could provide reduced travel resistance between the stop locations, and additional support and recovery spring force for fibrillations at the stop locations.

Fibrillation Strips

Figure 10:
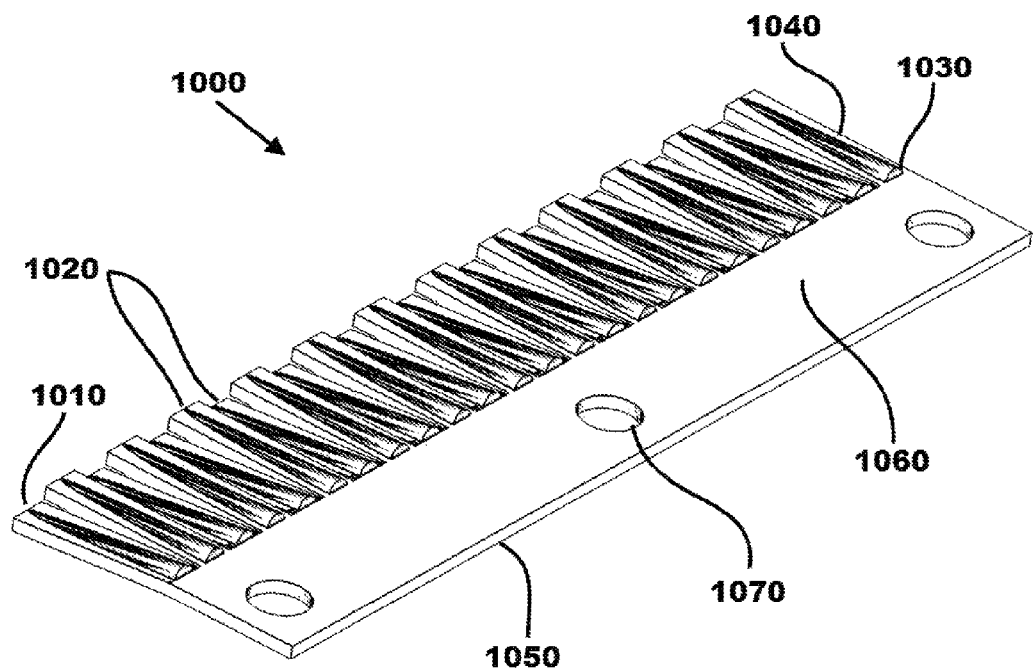
FIG. 10 is a diagram of a bottom view of a third embodiment of a gap seal cover.

A third embodiment of the present invention is shown in FIG. 10. The third embodiment implements a gap seal cover using at least one fibrillation strip 1000. In the third embodiment, the fibrillation strip 1000 has a substantially flat, rectangular shaped form, roughly divided into a fibrillation area 1040 with a fibrillation edge 1010, and a mounting area 1060 with a mounting area edge 1050. The fibrillation edge 1010 bounds one side of a fibrillation area 1040. The fibrillation area 1040 is divided into multiple fibrillations 1020. As with the first and second embodiments, an assist tab 1030 may be attached to at least one side of a fibrillation 1020. The connection area 1060 provides an area for the fibrillation strip 1000 to attach to a shift assembly (not shown). The third embodiment includes contains several connection perforations 1070, whereby the fibrillation strip 1000 may be affixed to a shift console by inserting pins, screws, tabs, or other fasteners through the connection perforations 1070. Alternatively, the connection area 1060 may be implemented without connection perforations 1070, and be secured to the shift console by other means familiar to persons having ordinary skill in the art. For example, the fibrillation strip may be secured to the shift console by clamping the connection area 1060. Similarly, the connection area 1060 may employ other attachment methods, such as tabs or ridges extending above and/or below the connection area to be inserted into corresponding slots or ridges in the shift console. Note that while FIG. 10 depicts alternate fibrillations 1010 as offset from one another, there is no objection to the fibrillations being substantially coplanar.

Two fibrillation strips 1000 may be set opposite each another to form a gap seal cover. A second fibrillation strip may be a mirror image of a first fibrillation strip, and the first fibrillation strip may be deployed opposite the second fibrillation strip so that the fibrillation edges 1010 are adjacent, forming a shift lever travel path. Alternatively, a single fibrillation strip 1000 may be used as a gap seal cover, where the shift lever traverses the area adjacent to the fibrillation edge 1010.

Manufacturing Methods

A fourth embodiment of the present invention is a first method for manufacturing the gap seal assembly. The first method involves a single mold, and a single material. This mold is formed to produce the gap seal cover as an integrated unit. The single material (such as a polyolefin or an elastomer) is injected into the mold, forming the gap seal assembly. Since the first manufacturing method uses a single material for the entire assembly, the collar and connection area may be thicker than the gap cover region, to provide more structural stability in the area of the assembly that is fastened to a shifter mechanism.

A fifth embodiment of the present invention is a second method for manufacturing the gap seal assembly involving a single mold and two materials. In this method, as with the first method, the mold is formed to produce the gap seal cover as an integrated unit. In this method, however, two materials are sequentially injected into two regions of the mold, known as a "two-shot mold." For example, the gap cover region may be formed by injecting elastomer with a relatively high flex modulus, for example, having a flex modulus between 200,000 psi and 1500,000 psi, and the collar and connection area may be formed by injecting a polypropylene with a relatively low flex modulus for example, having a flex modulus between 2,500 psi and 200,000 psi. This gives the connection area more structural rigidity for stability, while providing for more pliant and flexible fibrillations to flex around the lever shank and seal the gap.

While the two shot mold provides for efficient manufacturing of the gap seal assembly, the molds may be more expensive than single shot molds. Therefore, a third method for manufacturing an integrated gap seal assembly from two materials employs two single shot molds. For example, the first mold may form only the gap cover region and collar of the gap seal assembly. A first material, such as an elastomer, is injected into the first mold, forming the gap cover and collar. The gap cover and collar are then removed from the first mold and placed into a second mold. The second mold is shaped to form the connection area around the gap cover and collar. A second material, such as a thermoplastic, for example polypropylene, is injected into the second mold, forming the connection area integrated with the collar and gap cover region.

Additional variations on these manufacturing methods are possible. For instance, a gap seal cover may be manufactured where the connection area, collar and gap cover region are each made from different materials, or from similar materials with different flexibility properties. The methods used to manufacture these gap seal covers may employ multi-shot molds, or sequential use of several molds. A person having ordinary skill in the art will recognize additional variations on these methods that are encompassed by this disclosure.

An assembly as described above may overcome one or more inadequacies of the background art and/or has other benefits and advantages. One advantage may be enhanced performance through the integration of non-deforming gap seal fingers into the main housing body. A second advantage may be easier installation for an original equipment manufacturer, as there is just one housing component instead of multiple components. The present invention may provide a more aesthetically pleasing cover from the high performance aspect of the polymer materials used to make the housing and the fingers. Finally, the present invention may provide a less expensive cost to value ratio as this assembly may be much less costly to make than the previous designs.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention.

Other Applications

While the previous examples and embodiments have focused on a gear shift mechanism for illustration purposes, there are embodiments where the shank of other types of multi-position lever pass through a gap seal cover. For example, a seat adjustment mechanism may employ a gap seal cover where the shank of the adjusting lever passes through the gap seal cover. In such an application, the home position aperture may sit in the center of the shift lever travel path. A person having ordinary skill in the art will recognize similar variations of application for a gap seal cover that fall within the scope of this disclosure. The gap seal mechanism may also be used where the shift lever assembly has no home position, or no stop positions. That is, the gap seal mechanism may also be deployed where the shift mechanism may be moved or left at any position along the lever travel path.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A gap seal cover, comprising:
   a housing, where the housing is substantially flat with a top surface and a bottom surface further comprising:
      a gap cover region having a travel axis and a stationary axis;
      a shift lever travel path formed by a first slit through the gap cover region substantially parallel to the travel axis;
      multiple fibrillations formed by multiple fibrillation slits cut through the gap cover region where each fibrillation slit intersects the shift lever travel path, and each fibrillation is bounded by two fibrillation slits and the shift lever travel path; and
      a connection area surrounding the gap cover region; and
   multiple assistance tabs, each assistance tab is associated with a fibrillation, and each assistance tab is formed upon a bottom surface of the associated fibrillation,
   wherein the multiple assistance tabs are configured to provide a springing action to assist the associated fibrillation to return to an original position when the fibrillation is moved to a different position along the shift lever path.

2. The gap seal cover of claim 1, wherein the connection area further comprises a connection perforation.

3. The gap seal cover of claim 1, wherein the connection area further comprises a raised connection tab.

4. The gap seal cover of claim 1, further comprising a home position aperture disposed along the shift lever travel path.

5. The gap seal cover of claim 1, wherein the travel axis is substantially orthogonal to the stationary axis.

6. The gap seal cover of claim 5, wherein each fibrillation slit is substantially parallel to the stationary axis.

7. The gap seal cover of claim 1, wherein the housing further comprises a collar surrounding the gap cover region, whereby the connection area surrounds the collar.

8. The gap seal cover of claim 1, wherein the gap seal cover is fabricated at least in part from thermoplastic.

9. The gap seal cover of claim 1, wherein the gap seal cover is substantially rectangular.

10. The gap seal cover of claim 1, wherein the multiple fibrillations have a flex modulus in the range of 2,500 psi to 200,000 psi.

11. The gap seal cover of claim 10, wherein the connection area has a flex modulus in the range of 200,000 psi to 500,000 psi.

12. The gap seal cover of claim 11, wherein the assist tabs have a flex modulus in the range of 2,500 psi to 200,000 psi.

13. The gap seal cover of claim 1, wherein at least one said assistance tab has a substantially semicircular shaped cross section.

14. The gap seal cover of claim 1, wherein at least one said assistance tab has a substantially rectangular shaped cross section.

15. The gap seal cover of claim 1, wherein at least one said assistance tab has a substantially triangular cross section.

16. The gap seal cover of claim 1, wherein at least one said assistance tab has a substantially trapezoidal cross section.

17. The gap seal cover of claim 1, wherein a fibrillation has two or more assist tabs.

18. A gap seal cover, comprising:
   a first fibrillation strip, where the first fibrillation strip is substantially flat with a top surface and a bottom surface, and where the first fibrillation strip is substantially rectangular, the first fibrillation strip comprising
      a mounting area, where the mounting area spans a first side of the first fibrillation strip, the mounting area comprising a mounting area edge;
      a fibrillation area, where the fibrillation area spans a second side of the first fibrillation strip, where the fibrillation area is disposed opposite the mounting area, the fibrillation edge comprising:
         a fibrillation area edge; and
         multiple fibrillations; each of said multiple fibrillations formed by two fibrillation slits cut through the first fibrillation strip where each fibrillation slit intersects the fibrillation edge, each of said multiple fibrillations having a distal end formed by a portion of the fibrillation area edge, and each of said multiple fibrillations having a proximal end adjacent to the mounting area; and
   multiple assistance tabs, each of the multiple assistance tabs is associated with one of the multiple fibrillations, each of the multiple assistance tabs is formed upon a bottom surface of the associated fibrillation,
   wherein the multiple assistance tabs are configured to provide a springing action to assist the associated fibrillation to return to an original position when the fibrillation is moved to a different position along the shift lever path.

19. The gap seal cover of claim 18, further comprising a second fibrillation strip, where the second fibrillation strip is substantially a mirror image of the first fibrillation strip.

20. The gap seal cover of claim 18, wherein the connection area further comprises a connection perforation.

21. The gap seal cover of claim 18, wherein the connection area further comprises a raised connection tab.

22. The gap seal cover of claim 18, wherein the gap seal cover is fabricated at least in part from thermoplastic.

* * * * *